Sept. 25, 1962 W. P. OEHLER ET AL 3,055,322
PLANTER FRAME
Original Filed Dec. 31, 1956 2 Sheets-Sheet 2

INVENTORS.
WILLIAM P. OEHLER
HAROLD V. HANSEN
BY
R C Johnson
ATTORNEY

United States Patent Office 3,055,322
Patented Sept. 25, 1962

3,055,322
PLANTER FRAME
William P. Oehler and Harold V. Hansen, Moline, Ill.,
 assignors, by mesne assignments, to Deere & Company,
 a corporation of Delaware
Original application Dec. 31, 1956, Ser. No. 631,953.
 Divided and this application June 22, 1960, Ser. No.
 37,970
1 Claim. (Cl. 111—52)

This application is a division of our copending application, filed December 31, 1956, Ser. No. 631,953, for Planter Frame.

The present invention relates generally to agricultural implements and more particularly to multi-row planters and the like, particularly those having both planting and fertilizing units.

The object and general nature of the present invention is the provision of a new and improved frame structure for the above-mentioned type of implement, embodying two or more generally vertically spaced apart transversely extending main frame or sill members with means at the ends rigidly connecting said members, and also having a forwardly disposed generally transverse frame member also rigidly connected with the other members.

Further, it is another feature of this invention to provide new and improved seed planter and fertilizer distributor arrangements on the above-mentioned frame structure.

These and other objects and advantages of the present invention will be apparent to those skilled in the art after a consideration of the following detailed description, taken in conjunction with the accompanying drawings, in which.

Figure 1:
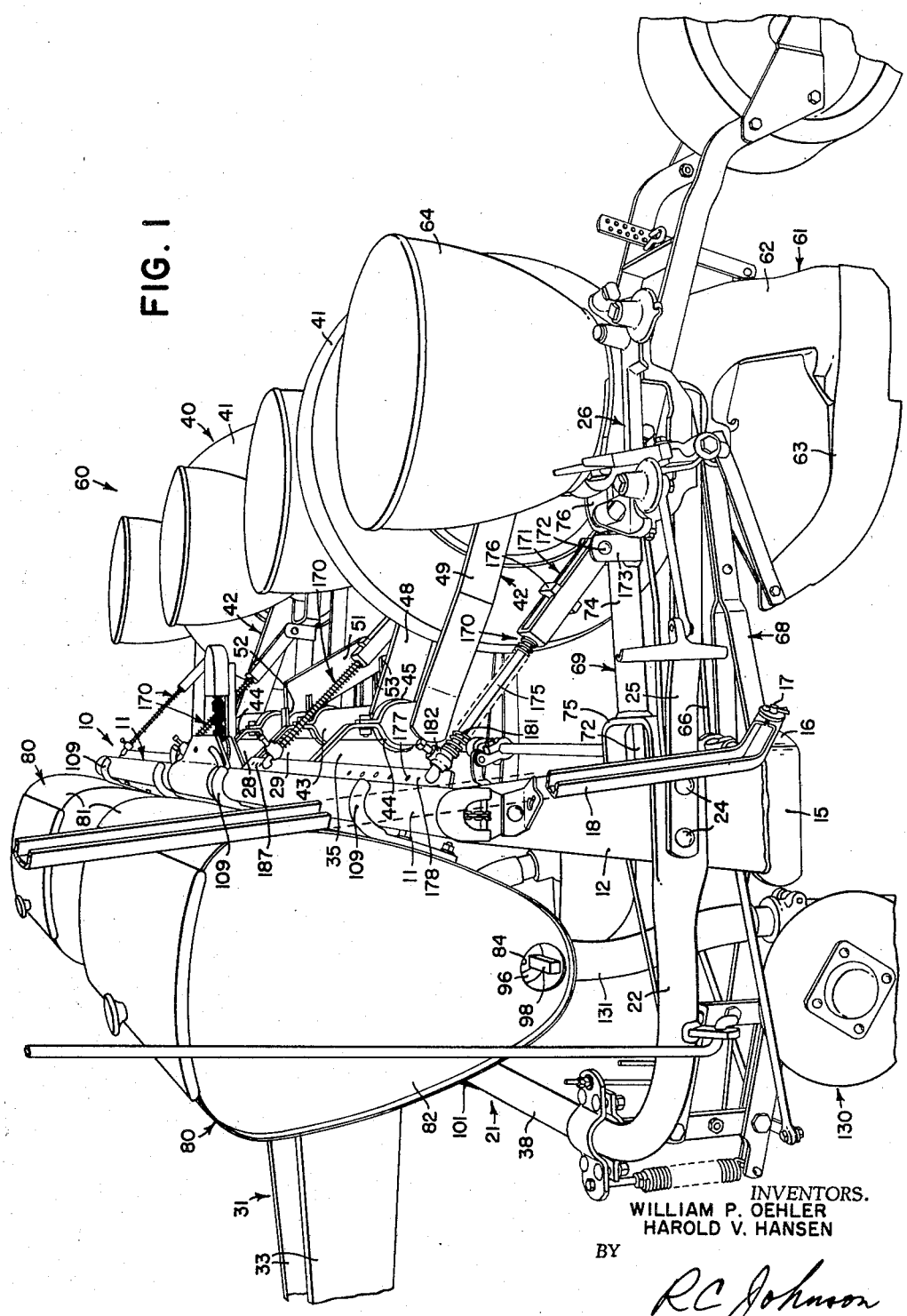
FIG. 1 is a fragmentary perspective view of the planting and fertilizing distributing implement in which the principles of the present invention have been embodied.

The planter of the present invention, as best shown in FIG. 1, comprises a main frame 10 that is made up of an upper sill bar, preferably in the form of a pipe, shown at 11, a pair of vertical end sections 12, generally triangular in configuration and secured in any suitable way, as by welding, at their upper ends to the ends of the upper sill pipe 11. The frame 10 also includes a lower transverse frame member 13, FIG. 2, preferably in the form of an angle that extends from one end to the other of the frame 10, each end being secured, as by welding, to the lower end of the associated end section 12 through a longitudinal part 15 that has one end 16 extended rearwardly and laterally inwardly, carrying a stud 17 that forms the bearing for the associated marker arm 18, only the lower portion of which is shown in FIG. 1. The part 15 is also securely fixed, as by welding, to the lower or base portion of the associated end section 12.

Figure 2:
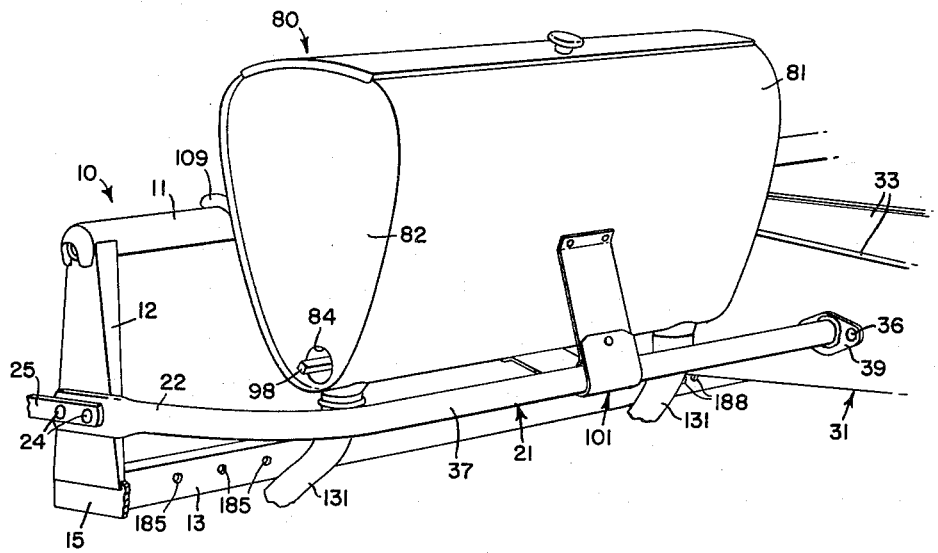
FIG. 2 is a fragmentary perspective view of one of the two fertilizer hoppers or containers, showing the manner in which the hoppers or containers or supported on the frame structure.

The main frame 10 also includes a front pipe frame or member 21 having its ends bent rearwardly, as indicated at 22, and flattened so as to fit against the outer face of the associated end section 12. The flattened section is apertured to receive a pair of attaching bolts 24 that also extend through apertures in the associated end section 12, and the bolts 24 also pass through the forward portion of an associated check head support bar 25 which at its rear end carries a check head 26 which is conventional, so far as the principles of the present invention are concerned. Other vertical members, such as those indicated at 28 and 29, FIG. 1, cooperate with the end sections and rigidly secure the lower sill angle 13 to the upper sill pipe member 11 to form a rigid structure. The frame 10 further includes a draft frame section 31 that comprises a pair of forwardly extending generally vertically arranged plates 33, the rear ends of which are detachably secured in any suitable way to the intermediate vertical frame sections 28 and 29. The frame 10 also includes other intermediate vertical frame sections 35 to provide the desired rigidity in the frame 10. Preferably, the intermediate vertical sections 28, 29 and 35 are shaped to fit against the lower frame angle 13 and are welded thereto. As best shown in FIGS. 1 and 2, the forward pipe member 21 is made up of right and left hand portions 37 and 38, each having its laterally inner end suitably connected to the associated draft frame member 33, as by an apertured connecting plate 39 secured by bolts 36 to the associated draft frame plate 33.

The implement shown in FIG. 1 is in the nature of a towed planter, the forward ends (not shown) of the draft frame members 33 being connected by suitable hitch means with a farm tractor or other suitable propelling means. The main frame 10 is raised and lowered into and out of transport and operating positions by virtue of ground-engaging means 40 that includes a pair of ground wheels 41 carried on a pair of wheel arms 42 that are fixed at their upper and forward ends to a rockable shaft member 43, preferably in the form of a pipe, journaled in pairs of inner and outer bearing brackets 44 and associated bearing straps 45 suitably bolted together and secured, as by welding, to the associated vertical frame sections 28, 29 and 35. Each wheel arm 42 includes an inner member 48 and an outer member 49 receiving the associated wheel 41 therebetween and secured, as by welding, to the rockable pipe member 43, preferably with the outer bearing parts 44 and 45 disposed between the members 48 and 49. An actuating arm 51 is securely fixed as by welding at its upper end to the generally central portion of the rockable pipe member 43, the connection being reenforced by a U-shaped strap 52 also welded to the arm 51 and to the pipe member 43, and the lower end of the arm 51 is apertured to receive a pair of straps 53 or other suitable means forming a forwardly extending link connected or adapted to be connected to a suitable operating mechanism, such as a hydraulic cylinder connected with, actuated by power derived from and normally operated by means on the tractor for controlling implements. By virtue of such means, a force is exerted against the arm 51 to swing the wheel frame 42, 43, thus raising and lowering the implement as a unit relative to the ground.

Figure 3:
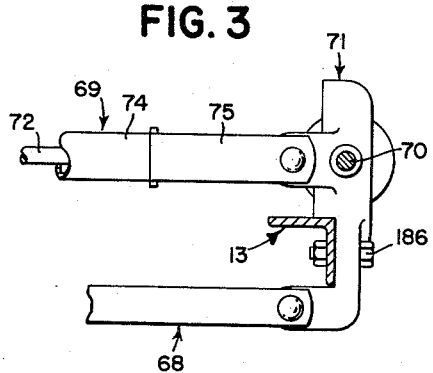
FIG. 3 is a fragmentary generally central sectional view showing the manner in which the planter units are connected with and supported on the frame structure.
Figure 4:
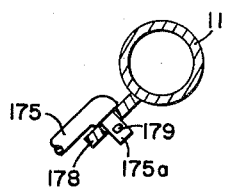
FIG. 4 is a fragmentary sectional view showing certain details of the laterally adjustable attaching means for the planting units.

The implement shown in FIG. 1 is provided with both seeding means and fertilizing means. The seeding means is indicated in its entirety by the reference numeral 60 and comprises a plurality of planting units 61, each including a generally vertically disposed shank casting 62 carrying at its lower end a furrow opening runner 63 and at its upper end a seed hopper 64 and associated seed-selecting and dispensing mechanism (not shown), which may be of any suitable construction, preferably like that shown, for example, in the U.S. Patent 2,340,163, issued January 24, 1944, to Charles H. White. As shown in the latter patent, such a planting unit includes suitable valve means operated by a link 66 (FIG. 1) that extends forwardly generally in parallelism with respect to lower link means 68 and upper link means 69 that connect each shank casting 62 with the associated frame 10. Preferably, the forward ends of the link members 68 and 69 are connected to an associated generally vertically disposed bracket fastened in any suitable way to the lower sill angle 13 of the frame 10. There is, of course, one bracket 71 (FIG. 3) for each planting unit 61, and the construction generally is similar to that shown in U.S. Patent 2,376,464, issued May 22, 1945, to Charles H. White, and hence further description appears to be unnecessary except to point out that the several brackets support a transverse extending drill shaft 70 that is connected through suitable gearing to drive a seeding shaft 72 that extends rearwardly to the seed dispensing mechanism in each of the planting units 61. The upper link 69 is in the nature of a pipe 74 through which the associated seeding shaft 72 extends, with front and rear yokes 75 and 76 pivotally connected to the associated bracket 71 and the forward portion of the runner shank 62, respectively.

The fertilizer dispensing means incorporated in the present implement comprises a pair of transversely elongated fertilizer hoppers or container 80. Each includes a hopper sheet 81 that is rolled to fit generally oval-like end plates 82, each of which has a lower opening 84. Distributing means in the form of an auger is disposed in the bottom of each hopper. The auger comprises a plurality of right and left hand auger sections 96, preferably in the form of castings, and a shaft 98 that is square in cross section and extends through correspondingly formed openings in the auger castings 96 and out through the associated openings 84. From FIG. 1 it will be noted that there are two planter units disposed substantially directly behind one elongated fertilizer hopper 80. Each hopper is swingably supported on the transverse portion of the front frame pipe member 21 by pivot means 101, as best shown in FIGS. 1 and 2. Hook members 109 are fixed to the back side of the hopper 80 and engage over the upper portion of the associated upper sill pipe 11 when the hopper is in its normal or vertical position, as shown in FIG. 1. By virtue of the means just described, the weight of the hopper and its contents is divided substantially equally between the frame members 11 and 21.

The implement 10 also includes a pair of fertilizer furrow opening units 130, the details of mounting of which do not per se form any part of the present invention. It therefore suffices to note that fertilizer from the hopper 80 is delivered to the units 130 through a pair of flexible conduits 131 and that the upper end of each of the conduits 131 is releasably connected with the associated hopper.

Referring again to FIG. 1, it will be noted that each of the planter units 61 has its upper link member 69 connected with the planter frame 10 by a spring cushioned lifting strut 170. Each of these members includes a lower U-shaped yoke 171 connected by pivot means 172 with a bracket 173 that is fixed, as by welding, to the rear portion of the associated pipe 74. The central or uppermost portion of the U-shaped yoke 171 is apertured to receive the lower end of a rod 175 that is slidable relative to the yoke 171. The lower end of each rod 175 is screw threaded and is adjustably disposed in a tapped opening formed in the block or nut member 176 that is slidably but non-rotatably disposed within the side sections of the yoke 171. The upper end of each rod 175 is reduced, as at 175a, and disposable in any one of a number of apertures 177 formed in a transversely disposed strip 178 that is fixed to and forms a part of the upper sill pipe 11, as best shown in FIG. 1. A pin 179 serves to hold the upper end of each rod in the selected opening 177.

A pressure spring 181 is disposed about the associated rod 175 between the upper end of the yoke 171 and a set screw collar 182 that is adjustably fixed to the upper portion of the rod 175. The lower sill angle 13, generally below the openings 177 in the associated attaching strip 178, is provided with a plurality of openings 185 adapted to receive bolt means 186 or the like (FIG. 3) by which the associated bracket 71 may be attached in different lateral positions to the angle 13. The bracket 71 preferably is in the form of a housing enclosing the gears or other means that transmits power from the drill shaft 70 to the associated seeding shafts 72. Thus, by removing the pin 179 and bolts 186, each planting unit may be shifted laterally along the lower sill angle 13 and the upper attaching strip 178 so as to provide for change of row spacing.

To accommodate changes in the position of the laterally inner planting units 61, the upper strip 178 is provided with a plurality of openings 187 and the lower sill angle 13 is provided with a similar set of openings 188. These latter openings are spaced apart only about half the distances between the openings 177 and 185 since to change the row spacing, it is necessary to vary the positions of the latter outer units twice the amount the positions of the inner planter units are varied.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

In a multi-row planter, frame means comprising a front frame member including an elongated transversely arranged intermediate section and rearwardly extending end sections, an upper transverse bar disposed above the level of said front frame member, generally vertical end members rigidly connected at their upper ends, respectively, to the outer ends of said upper bar and rigidly connected at their lower end portions, respectively, to the ends of said rearwardly extending end sections of the front frame member, the lower ends of said end members extending downwardly below the rearwardly extending end sections of said front frame member, a lower transverse frame bar generally parallel to the upper transverse frame bar and rigidly connected at its ends with the lower ends of said vertical end members, planting means connected with said upper transverse bar and said lower bar in trailing relation generally behind the latter, and fertilizer containers supported on said front frame member and said upper bar and disposed in a relatively low position generally in front of said upper bar and generally in front of said planting means.

References Cited in the file of this patent

UNITED STATES PATENTS

| | | |
|---|---|---|
| 126,250 | Barbour | Apr. 30, 1872 |
| 622,996 | Detheridge | Apr. 11, 1899 |
| 2,187,861 | Martel | Jan. 23, 1940 |
| 2,486,462 | Carelock | Nov. 1, 1949 |
| 2,610,563 | Lambson | Sept. 16, 1952 |
| 2,719,498 | Goolsby | Oct. 4, 1955 |
| 2,781,733 | Graham | Feb. 19, 1957 |
| 2,906,436 | Oehler | Sept. 29, 1959 |